(12) United States Patent
Yamada et al.

(10) Patent No.: US 7,335,873 B2
(45) Date of Patent: Feb. 26, 2008

(54) LIGHT CONDENSING METHOD AND LIGHT CONDENSER AS WELL AS NEAR-FIELD OPTICAL MICROSCOPE AND STORAGE DEVICE FORMED BY APPLYING THE SAME

(75) Inventors: Tomohiro Yamada, Kanagawa (JP); Natsuhiko Mizutani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 203 days.

(21) Appl. No.: 10/885,663

(22) Filed: Jul. 8, 2004

(65) Prior Publication Data

US 2005/0007654 A1    Jan. 13, 2005

(30) Foreign Application Priority Data

Jul. 11, 2003    (JP) .............................. 2003-273186

(51) Int. Cl.
*G02F 1/01*    (2006.01)
*G02F 1/00*    (2006.01)

(52) U.S. Cl. ...................................... 250/225; 359/321

(58) Field of Classification Search ............. 250/203.1, 250/201.3, 225, 216; 359/321
See application file for complete search history.

(56) References Cited

U.S. PATENT DOCUMENTS

| | | | |
|---|---|---|---|
| 5,284,364 A * | 2/1994 | Jain ............................ 359/501 |
| 6,285,020 B1 * | 9/2001 | Kim et al. .................... 250/216 |
| 2002/0126380 A1 * | 9/2002 | Schuster ...................... 359/485 |
| 2003/0128945 A1 * | 7/2003 | Sugiura et al. ............. 385/123 |
| 2003/0173501 A1 * | 9/2003 | Thio et al. ................... 250/216 |
| 2003/0227623 A1 * | 12/2003 | Zhan et al. .................. 356/369 |

* cited by examiner

*Primary Examiner*—Georgia Epps
*Assistant Examiner*—Kevin Wyatt
(74) *Attorney, Agent, or Firm*—Fitzpatrick, Cella, Harper & Scinto

(57) ABSTRACT

A light-condensing method of irradiating light whose electric field vectors show two or more than two different directions onto a member having apertures arranged at least at two positions and forming a light-condensing section having a strong electric field between the apertures arranged at two positions.

6 Claims, 6 Drawing Sheets

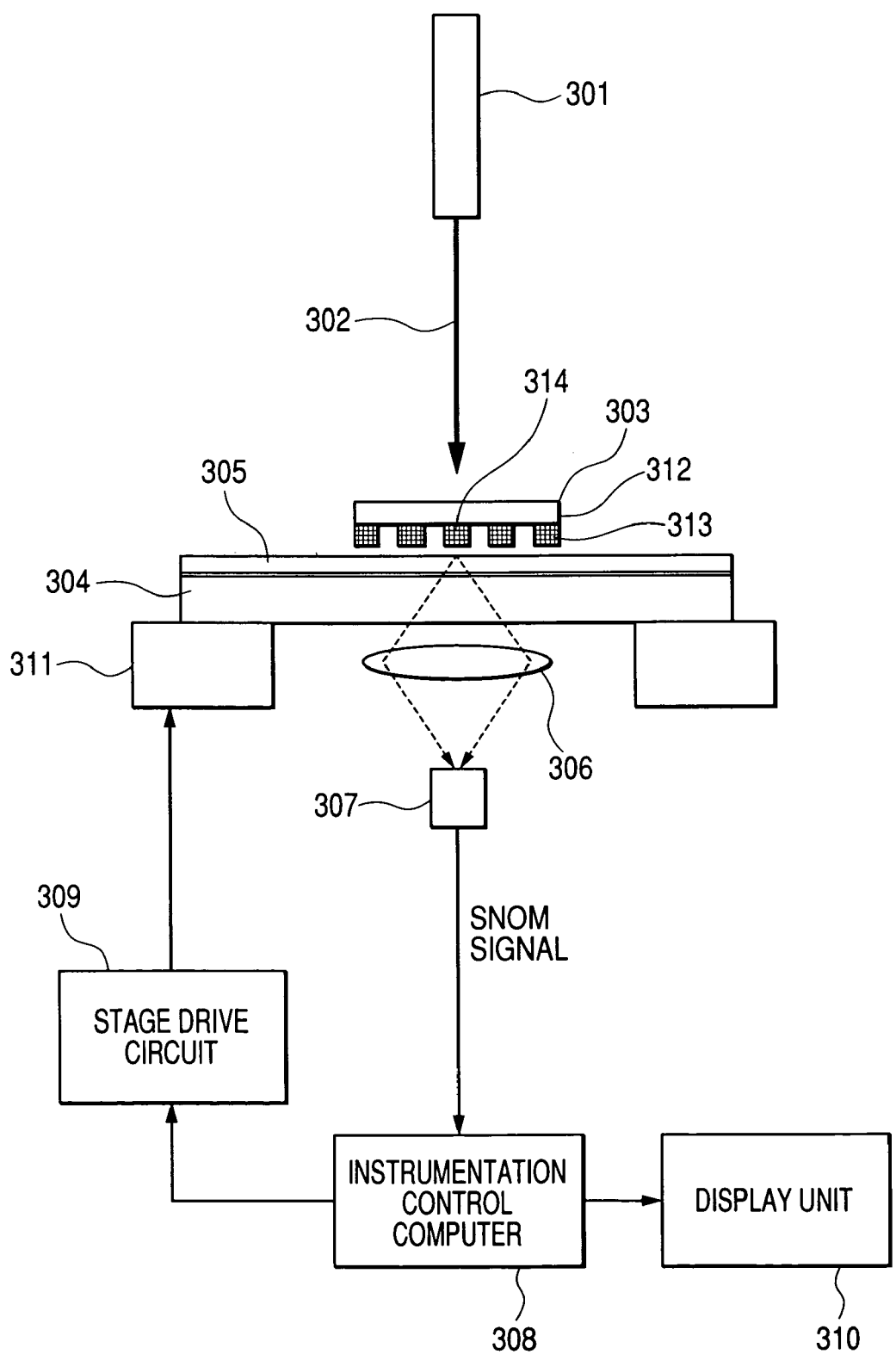

ELECTRIC FIELD VECTORS AS VIEWED
IN THE DIRECTION OF BEAM PROPAGATION

LIGHT-SHIELDING SECTION

LIGHT-TRANSMITTING SECTION

LIGHT CONDENSING METHOD AND LIGHT CONDENSER AS WELL AS NEAR-FIELD OPTICAL MICROSCOPE AND STORAGE DEVICE FORMED BY APPLYING THE SAME

This application claims priority from Japanese Patent Application No. 2003-273186 filed on Jul. 11, 2003, which is hereby incorporated by reference.

BACKGROUND OF THE INVENTION

1. Field of the Invention

This invention relates to a light-condensing method and a light condenser and also to a near-field optical microscope and a storage device realized by applying such a light-condensing method and such a light condenser.

2. Related Background Art

Various microscopes and storage devices using optical near-field have been proposed along with exposure techniques also using an optical near-field (see, inter alia, Durig et al., J. Appl. Phys. 59, 3318 (1986), U.S. Pat. No. 6,171, 730). Particularly, the exposure technique disclosed in U.S. Pat. No. 6,171,730 has contributed greatly to the related technical fields because of its excellence.

The known techniques mostly utilize an optical near-field generated from a micro-aperture or an optical near-field generated from a slit or a gap.

For example, microscopes using an optical near-field are adapted to bring an optical near-field generated from a slit by light from a light source close to the surface of a specimen arranged on a substrate and obtain an image of the surface of the specimen by using resultant scattering light. Storage devices of the above identified type are such that light from a light source is irradiated onto a recording medium and scattering transmitted light from a micro-aperture of a periodic structure formed on the surface of the recording medium is used for signal recording/reproduction.

Meanwhile, researches are being made to develop techniques for patterning the directions and the distributions of the electric field of light in propagating light and analyzing the behaviors of beams of light prepared in this way (see Ze'ev Bomzon et al., Appl. Phys. Lett. Vol 79, 1587 (2001)). Particularly, researches are being made on light whose electric field vectors are rotation-symmetric, radial and dimensionally equal at equidistant points from the center of symmetry.

However, with known near-field optical microscopes and storage devices, when photoelectric field is concentrated to such a micro-region by using an optical near-field generated from a micro-aperture of a periodic structure or a slit, the intensity distribution of the electric field of light generated in the vicinity of the emission port of the micro-aperture or the slit is dependent on the edge roughness and the aperture diameter of the micro-aperture or the slit to a great extent. Thus, conventionally, the controllability of the edge roughness and the machining precision for the diameter of the micro-aperture are required to an enhanced degree.

SUMMARY OF THE INVENTION

In view of the above identified circumstances, it is therefore an object of the present invention to provide a light-condensing method and a light condenser that can suppress the dependency of the intensity distribution of the electric field of light generated in the vicinity of the emission port of a micro-aperture or a slit on the edge roughness and the aperture diameter of the micro-aperture or the slit as well as an optical near-field microscope and a storage device realized by applying such a light-condensing method and such a light condenser.

According to the invention, there are provided a light-condensing method and a light condenser as described below and also a near-field microscope and a storage device realized by applying such a light-condensing method and such a light condenser.

More specifically, in an aspect of the invention, there is provided a light-condensing method of irradiating light whose electric field vectors show two or more than two different directions onto a member having apertures arranged at least at two positions and forming a light-condensing section having a strong electric field between the apertures arranged at two positions.

Preferably, in a light-condensing method according to the invention, said member is formed by a member having a periodic structure of periodically arranging slits or pairs of slits.

Preferably, in a light-condensing method according to the invention, said periodic structure is. formed by concentrically arranging lines and spaces or slits.

Preferably, in a light-condensing method according to the invention, said slits are arranged in the form of a lattice.

Preferably, in a light-condensing method according to the invention, said distribution of electric field vectors is rotation-symmetric or inversion-symmetric.

Preferably, in a light-condensing method according to the invention, said distribution of electric field vectors is rotation-symmetric and radial and whose electric field vectors are dimensionally equal at equidistant points from the center of symmetry.

In another aspect of the invention, there is provided a light condenser comprising a member having apertures arranged at least at two positions and a light irradiation means for irradiating light whose electric field vectors show two or more than two different directions, a light-condensing section having a strong electric field being formed between the apertures arranged at two positions.

Preferably, in a light condenser according to the invention, said member is formed by a member having a periodic structure of periodically arranging slits or pairs of slits.

Preferably, in a light condenser according to the invention, said periodic structure is formed by concentrically arranging lines and spaces or slits.

Preferably, in a light condenser according to the invention, said slits are arranged in the form of a lattice.

Preferably, in a light condenser according to the invention, said light irradiation means is adapted to irradiate light whose distribution of electric field vectors is rotation-symmetric or inversion-symmetric.

Preferably, in a light condenser according to the invention, said light irradiation means is adapted to irradiate light whose distribution of electric field vectors are rotation-symmetric and radial and whose electric field vectors are dimensionally equal at equidistant points from the center of symmetry.

In still another aspect of the invention, there is provided a near-field optical microscope comprising a member having micro-apertures and a light irradiation means for irradiating light from a light source onto said member and adapted to bring an optical near-field generated from the micro-apertures by the light irradiation of the light irradiation means close to the surface of a specimen arranged on a substrate and detect an image of the surface of the specimen by using resultant scattering light, said member having micro-apertures and said light irradiation means being formed respectively by the member having apertures and the light irradiation means of a light condenser as defined above.

In still another aspect of the invention, there is provided a storage device comprising a recording medium having micro-apertures on the surface thereof and a light irradiation means for irradiating light from a light source onto said recording medium and adapted to recording/reproducing signals by using scattering transmitted light produced from the micro-apertures of the recording medium as a result of light irradiation by the light irradiation means, said structure having micro-apertures of said recording medium and said light irradiation means being formed respectively by the member having apertures and the light irradiation means of a light condenser as defined above.

Thus, the present invention provides a light-condensing method and a light condenser that can suppress the dependency of the intensity distribution of the electric field of light generated in the vicinity of the emission port of a micro-aperture or a slit on the edge roughness and the aperture diameter of the micro-aperture or the slit when the optical near-field generated from the micro-aperture or the slit is used and an electric field of light is concentrated to the micro-region. The present invention also provides an optical near-field microscope and a storage device realized by applying such a light-condensing method and such a light condenser.

BRIEF DESCRIPTION OF THE DRAWINGS

FIG. 1A is a schematic cross sectional view taken along line 1A-1A in FIG. 1B showing the light-shielding layer of a periodic structure and FIG. 1B is a schematic plan view of the periodic structure of FIG. 1A;

FIG. 3 is a schematic illustration of the configuration of the near-field optical microscope (SNOM) of Example 2 where a light-condensing method according to the invention is applied to the microscope in an illumination mode;

DESCRIPTION OF THE PREFERRED EMBODIMENTS

Now, the present invention will be described in greater detail by referring to the accompanying drawings that illustrate preferred embodiments of the invention.

Figure 1A:
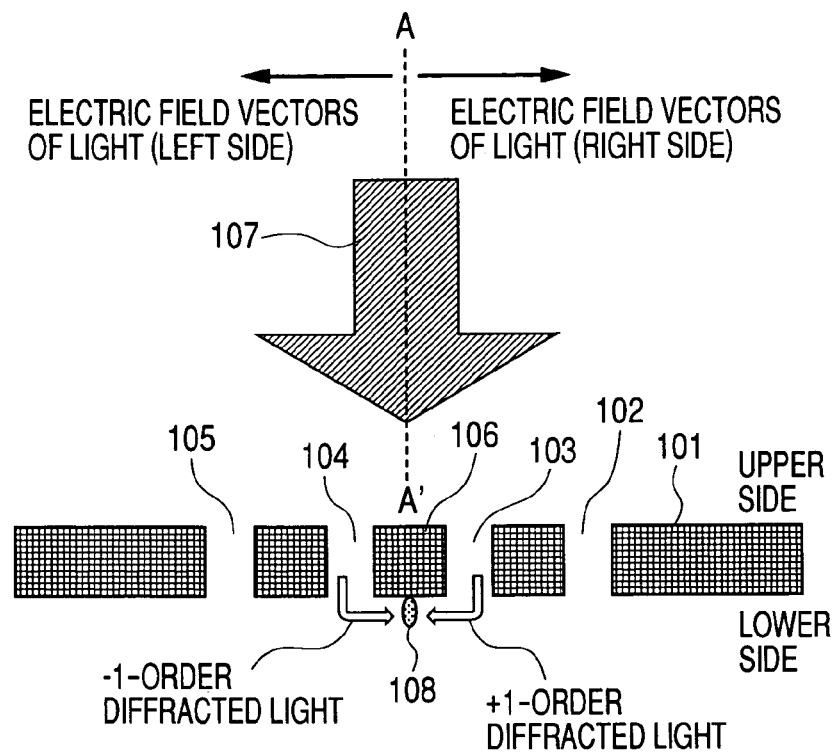
FIGS. 1A and 1B are schematic illustrations of the principle that enables a highly efficient formation of a strong electric field in an embodiment of the present invention.
Figure 1B:
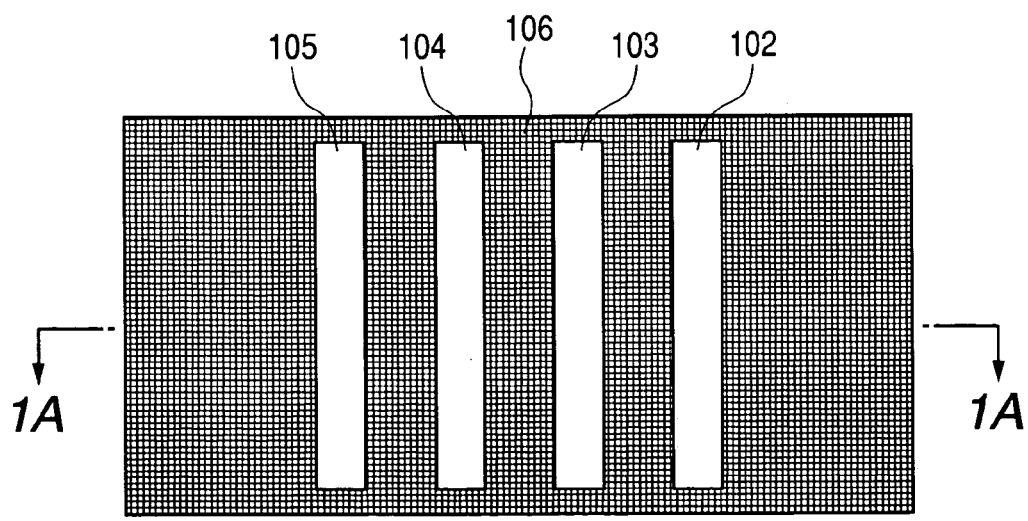

FIGS. 1A and 1B are schematic illustrations of the principle that enables a highly efficient formation of a strong electric field under a light-shielding section located at the center of a periodic structure by causing an irradiated beam of light having differently directed electric field vectors to strike the periodic structure.

FIG. 1A is a schematic cross sectional view taken along line 1A-1A in FIG. 1B showing the light-shielding layer of the periodic structure and FIG. 1B is a schematic plan view of the periodic structure of FIG. 1A.

Referring to FIG. 1A, an irradiated beam of light 107 is made to strike the periodic structure 101. Note that the pitch of the periodic structure 101 and the size of the apertures are smaller than the wavelength of incident light. In FIG. 1A, the electric field vectors of the irradiated beam of light 107 are directed in such a way that those located to the right of the dotted line A-A' are directed rightward whereas those located to the left of the dotted line A-A' are directed leftward.

The irradiated beam of light is coherent or partially coherent and whose spatial coherence is greater than the propagation length of surface plasmon polaritons (to be referred to as SPP hereinafter).

As the beam strikes the periodic structure 101 as shown in FIG. 1A, an optical near-field is generated from slit 102, slit 103, slit 104 and slit 105. The generated optical near-fields energize surface plasmon polaritons on the surface of the periodic structure. Take, for example, the slit 103 and the slit 104. Plus first-order primary diffracted light from the slit 103 and minus first-order diffracted light from the slit 104 (both are optical near-fields) show the same phase when the coherent light component is irradiated and hence the SPPs energized by the optical near-fields show the same phase right under the light-shielding section 106 so that a strong electric field is formed there and concentrated in a micro-region (strong electric field generating section 108). This is a phenomenon that remarkably appears right under the light-shielding section 106.

The size and the profile of the electric field distribution do not remarkably depend on the edge roughness of the light-shielding section and the machining precision in terms of the line width because of the interference of optical near-fields, or the mutual interference effect of SPPs generated from the slits. Rather, they depend on the pitch of arrangement of the slits. If the pitch of arrangement of the slits is integer times of the wavelength of SPPs on the surface of the periodic structure, the interference effect of SPPs appears remarkably to particularly intensify the distribution of the electric field right under the light-shielding section 106.

Additionally, some components of surface plasmons generated from the entire periodic structure 101 gather under the light-shielding section 106 so that the entire periodic structure 101 operates as a sort of SPP condensing lens. As a result, it is possible to form a strong electric field under the light-shielding section 106 highly efficiently.

The profile of the light-shielding section 106 is not limited to that of lines and spaces. In other words, it may have a profile of a lattice, that of concentric circles or some other profile so long as it shows a periodic structure, which may be a partially periodic structure.

If the size of the light transmitting parts of the periodic structure is sufficiently smaller than the wavelength of incoming light, they contribute only to the components of optical near-fields generated at the outgoing side whose direction of polarization is perpendicular to the slits. In other words, the polarized components of incident light do not necessarily have to be rigorously perpendicular to the periodic structure.

Now, the present invention will be described further by way of examples.

EXAMPLE 1

Figure 2A:
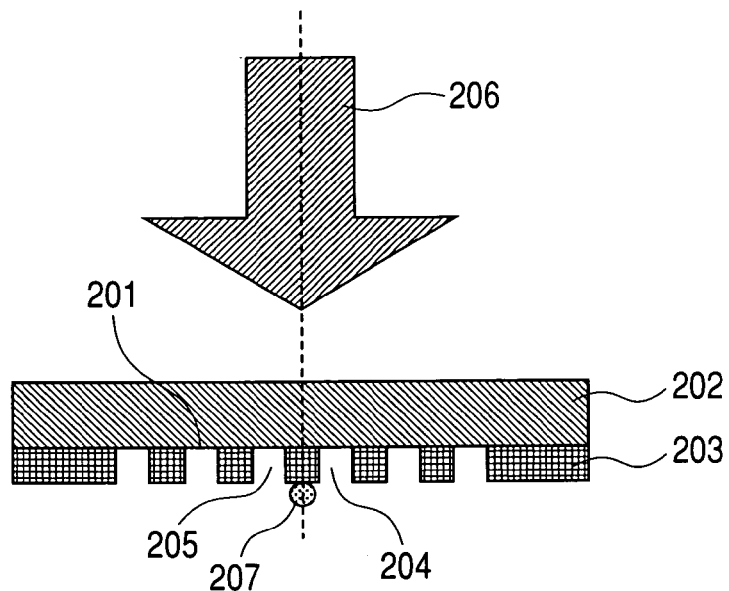
FIGS. 2A and 2B are schematic illustrations of the light-condensing method of Example 1.
Figure 2B:
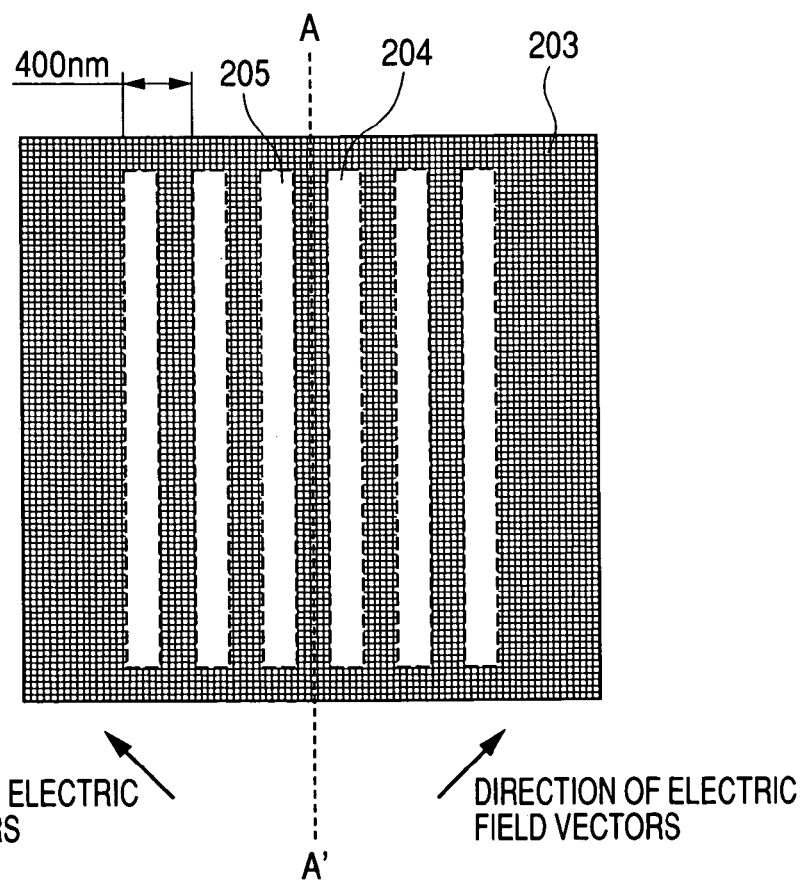

FIGS. 2A and 2B are schematic illustrations of the light-condensing method of Example 1.

Firstly, a periodic structure 201 is prepared. The periodic structure 201 comprises a base member 202 made of silicon nitride and a light-shielding section 203 made of Cr.

The periodic structure 201 shows a pitch of arrangement of 400 nm as shown in FIG. 2B. A beam of light 206, whose electric field vectors are directed differently at the right side and at the left side relative to the dotted line A-A', is irradiated onto the periodic structure 201.

Such a beam of light can be prepared by causing linearly polarized light to strike the interface of two substances typically showing different optical rotations. However, such a beam of light can be prepared in some other way. For example, it may be prepared by means of a diffraction grating showing a certain pattern or a phase-shift device.

As such a beam of light is irradiated onto the periodic structure 201 as shown in FIG. 2A, a light-condensing section 207 is generated under the light-shielding section located at the center between the light transmitting section 204 and the light transmitting section 205. The light-condensing section 207 shows a linear profile.

A linear exposure pattern is formed as the periodic structure 201 carrying a light condensing section 207 with a strong electric field that is generated by such a beam of light is brought close to a substrate to be exposed. It is possible to expose the entire periodic structure to light when the positional relationship between the periodic structure and the substrate to be exposed is fixed and the spot of irradiation of the beam is moved.

A light-condensing method according to the invention can form an intensity distribution of electric field, where the profile of the light-condensing section does not remarkably depend on the machining precision of the light-shielding section. As a result, it is possible to prepare an exposure pattern whose profile does not depend on the machining precision of the light-shielding section of the periodic structure. While the periodic structure of this example is made to show a profile of lines and spaces, it is by no means limited thereto. In other words, it may have a profile of a lattice, that of concentric circles or some other profile.

Figure 8:
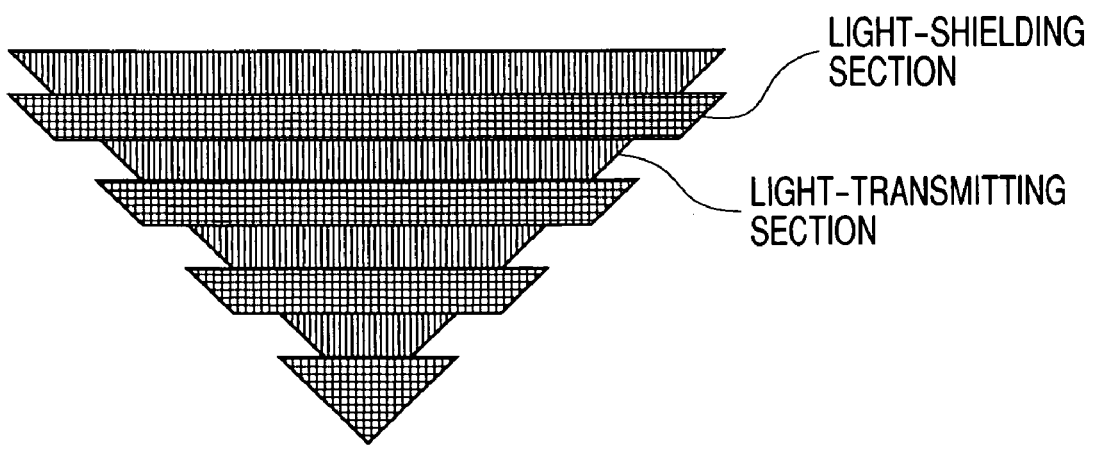
FIG. 8 is a schematic illustration of a periodic structure that is three-dimensional and can be applied to Example 1.

The periodic structure is not necessarily two-dimensional and may alternatively be three-dimensional as shown in FIG. 8. The distribution of electric field vectors of the beam is not necessarily limited to the one described above for this example and may alternatively be rotation-symmetric or inversion-symmetric.

EXAMPLE 2

FIG. 3 is a schematic illustration of the configuration of the near-field optical microscope (SNOM) of Example 2 where a light-condensing method according to the invention is applied to the microscope in an illumination mode.

Referring to FIG. 3, beam generator 301 is adapted to generate a beam showing a distribution of electric field vectors that is rotation-symmetric as indicated by the arrows in FIG. 4 (to be referred to as radially polarized beam hereinafter). The radially polarized beam 302 generated from the beam generator is irradiated onto periodic structure 303.

Figure 5:
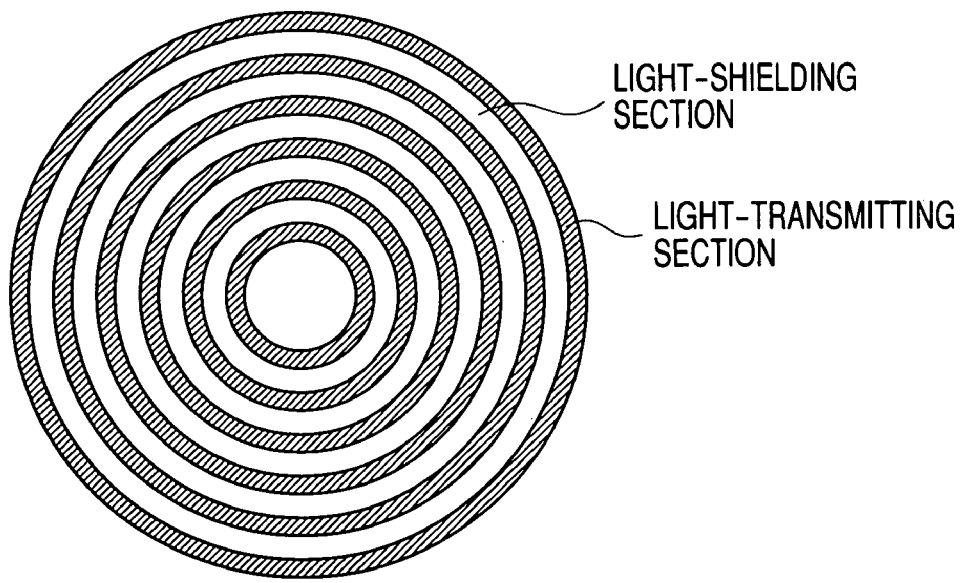
FIG. 5 is a schematic illustration of concentric slits that are used in Example 2.

The periodic structure 303 comprises a base member 312 and has concentric slits 313 formed thereon at a pitch of 400 nm as shown in FIG. 5. The light-transmitting slits have a width of about 50 nm.

A light-condensing section is formed under the light-shielding section 314 on the surface thereof at the light-outgoing side. The light-condensing section is brought close to the surface of specimen 305 placed on the substrate 304 to a distance of less than 100 nm and scattering light generated as a result of irradiation of light is condensed by a condensing lens 306 and detected by a photomultiplier 307. The detected light is used as SNOM signal and input to an instrumentation control computer 308.

A drive signal for driving xyz stage 311 is output from the instrumentation control computer 308 by way of stage drive circuit 309 to three-dimensionally control the position of the xyz stage 311.

The instrumentation control computer 308 drives the light-condensing section to scan the specimen 305 by driving the xyz stage 311 and three-dimensionally plots the SNOM signal as a function of the position of the light-condensing section to form an SNOM image and display it on a display unit 310.

A level of resolution that exceeds the limit of diffraction of light can be attained by forming an illumination mode SNOM device, using a light-condensing method according to the invention.

With a light-condensing method according to the invention, the profile of the light-condensing section does not remarkably depend on the machining precision of the periodic structure so that periodic structures can be manufactured at a high yield. Additionally, the specimen can be observed efficiently with a quick operation because optical near-fields can be generated highly efficiently.

A storage device or an exposure device can be formed by using the arrangement of this example.

EXAMPLE 3

Figure 6:
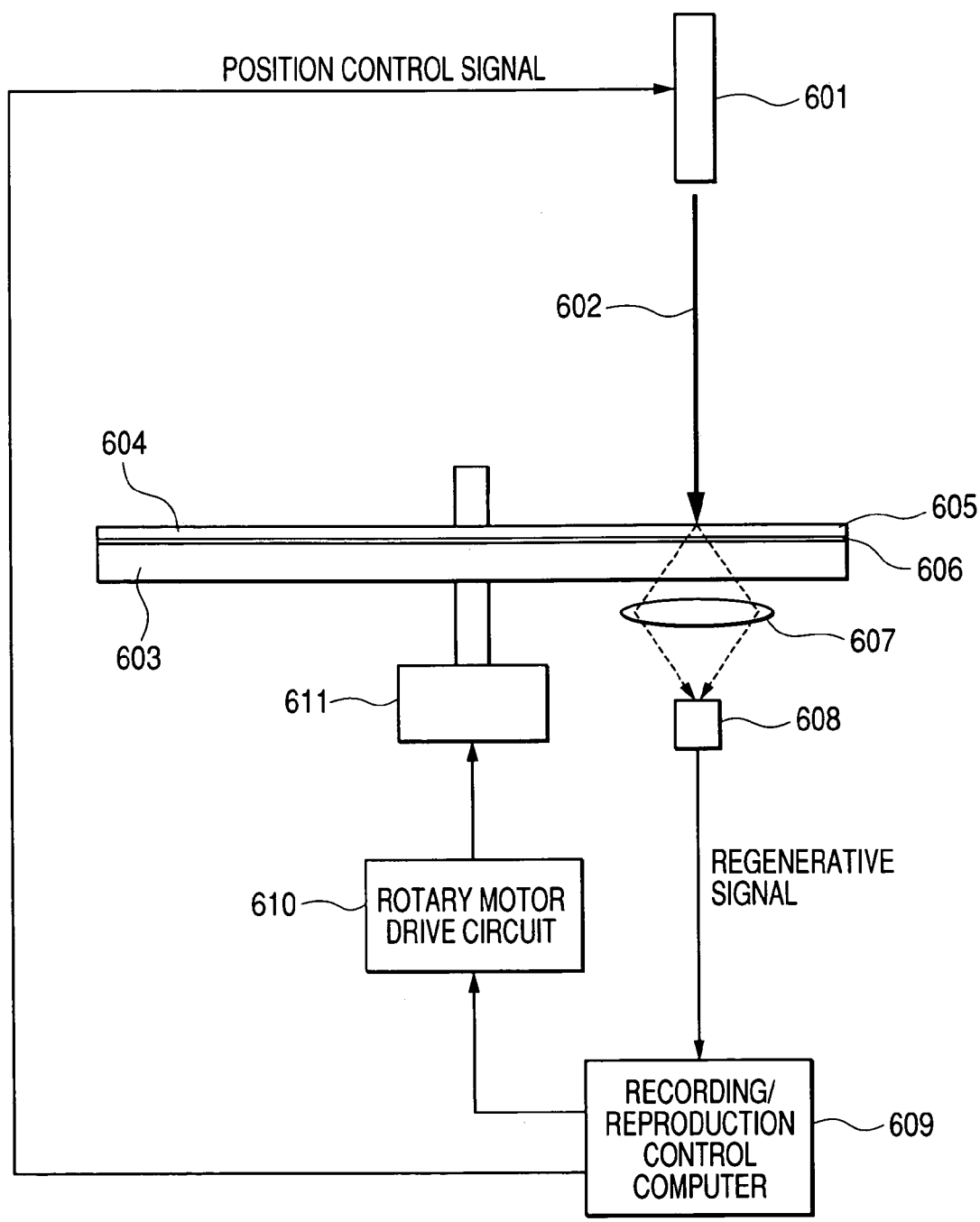
FIG. 6 is a schematic illustration of the configuration of the storage device of Example 3, where a light-condensing method according to the invention is applied to the storage device.

FIG. 6 is a schematic illustration of the configuration of the storage device of Example 3, where a light-condensing method according to the invention is applied to the storage device.

Figure 4:
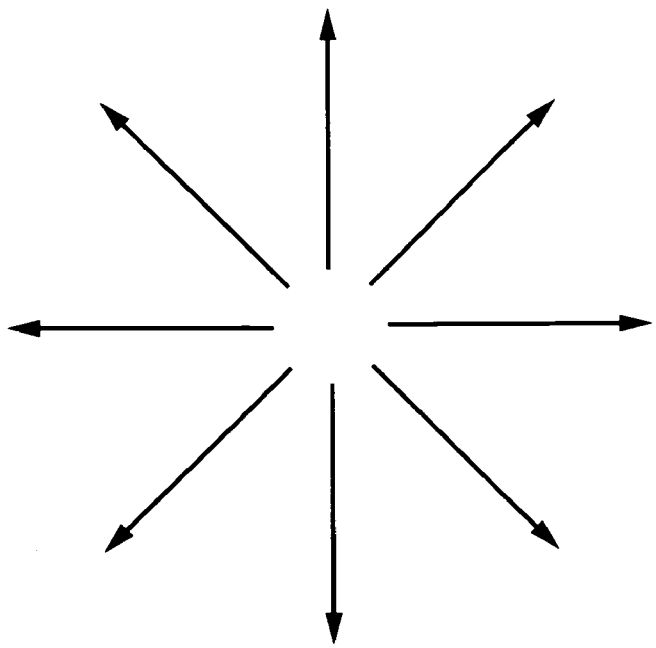
FIG. 4 is a schematic illustration of a beam (radially polarized beam) showing a distribution of electric field vectors that are rotation-symmetric, which is used in Example 2.

Referring to FIG. 6, beam generator 601 generates a beam showing a distribution of electric field vectors that is rotation-symmetric as shown in FIG. 4. The radially polarized beam 602 generated from the beam generator 601 is irradiated onto a recording medium 604 arranged on a substrate 603 for recording/reproducing signals.

Figure 7:
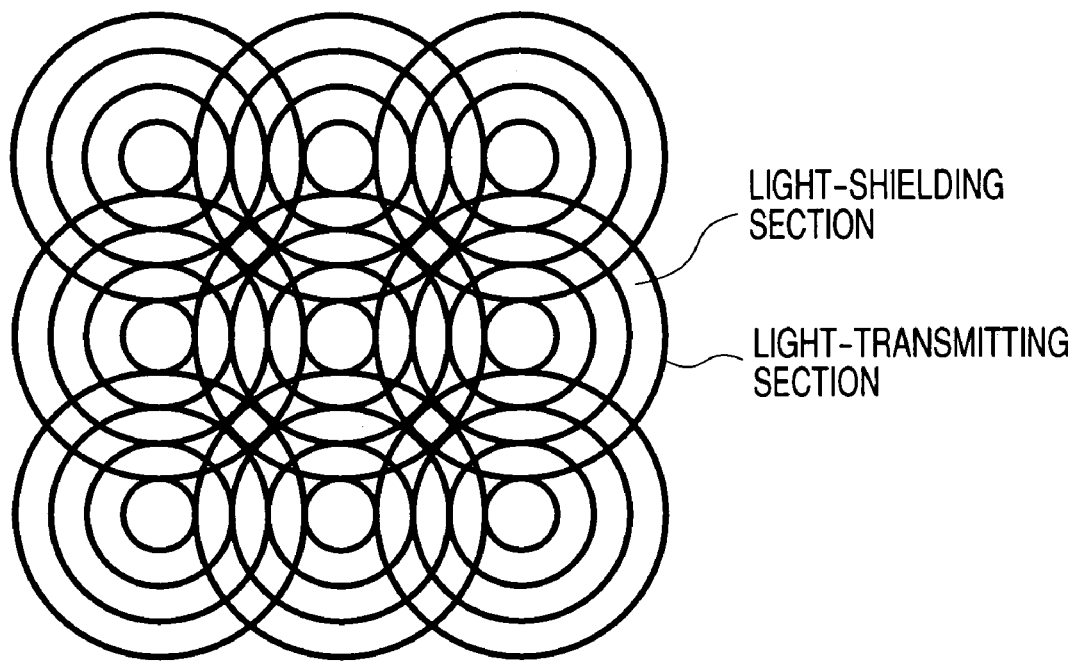
FIG. 7 is a schematic illustration of the configuration of the periodic structure layer that is two-dimensional structure and formed on the surface of the recording medium of Example 3.

The surface of the recording medium 604 has a periodic structure layer 605, whose two-dimensional structure is illustrated in FIG. 7. An optical near-field showing a high intensity is irradiated onto the recording medium 604 for recording by raising the intensity of the beam, whereas an optical near-field showing a low intensity is irradiated onto the recording medium 604 by lowering the intensity of the beam. Then, scattering transmitted light is condensed by condensing lens 607 and whose intensity is detected by an avalanche photodiode 608 to produce a regenerative signal, which is then input to recording/reproduction control computer 609.

The recording/reproduction control computer 609 drives the rotary motor 611 by way of rotary motor drive circuit 610 so as to rotate the recording medium 604 relative to the beam.

The obtained signal is input to the recording/reproduction control computer 609 as tracking (alignment) control signal so as to be used to align the recording medium 604 relative to the beam generator 601.

As a storage device is formed by using a light-condensing method according to the invention, it is possible to realize a recording density that exceeds the limit of diffraction of light. This is because a pattern of concentric circles is formed on the recording medium at a pitch that undergoes the limit of diffraction of light.

When the concentric circles are irradiated by a radially polarized beam and the center of radially polarized beam and that of the concentric circles agree with each other, only the concentric circles are strongly energized and a light-condensing spot is formed at the center thereof. Thus, cross talks among the recorded bits are suppressed.

Additionally, the center of the concentric circles that is located near the center of the radially polarized beam is energized highly efficiently if compared with any other center of concentric circles. Therefore, if it is desired to energize only a center of concentric circles, it can be selectively energized if it is not rigorously aligned with the center of the beam so long as it is located close to the latter if compared with any other centers of concentric circles. Therefore, the positional accuracy of the beam to be used for energizing a center of concentric circles may be low so that it is possible to curtail the time necessary for the alignment and simplify the configuration of the arrangement.

Additionally, information can be recorded and reproduced quickly because it is possible to generate an optical near-field highly efficiently. While a radially polarized beam is irradiated onto the surface of a recording medium showing a pattern of concentric circles in this example, the present invention is by no means limited to such an arrangement and, alternatively, a beam showing a distribution of electric field vectors that is inversion-symmetric or a beam showing a distribution of electric field vectors that is rotation-symmetric may be irradiated onto the surface of a recording medium showing a lattice pattern that can be prepared with ease.

What is claimed is:

1. A light-condensing method, comprising the steps of:
preparing a member having a surface including a light-shielding part and at least two light transmitting slit apertures having a width direction and a length direction, said member adapted to generate near-field light; and,
irradiating the surface of the member with light comprising two electric field vector components having opposite directions to each other at the same moment such that the two electric field vector components are parallel to the width direction of the slit apertures to form a light-condensing section having a stronger optical near-field under the light-shielding part and between the two light-transmitting slit apertures than under the light-transmitting aperture.

2. A light condenser comprising:
a member having a surface including a light-shielding part and at least two light-transmitting slit apertures having a width direction and a length direction, said member adapted to generate near-field light;
light irradiation means for irradiating the surface of the member with light comprising two electric field vector components having opposite directions to each other at the same moment; and,
supporting means for supporting the member, pg,22
wherein the member, the light irradiation means, and the supporting means are arranged such that the two electric field vector components of the light are parallel to the width direction of the slit apertures, and a light-condensing section is formed under the light-shielding part and between the two light-transmitting slit apertures, said section having a stronger optical near-field than the optical near-field under the light-transmitting slit apertures when the surface of the member is irradiated with the light.

3. A method according to claim 1, wherein said member is formed having a periodic structure of periodically arranged slits.

4. A method according to claim 3, wherein said periodic structure is formed by concentrically arranging slits.

5. A method according to claim 3, wherein the pitch of the slits is an integer times the wavelength of surface plasmon polaritons on the surface of the periodic structure.

6. A method according to claim 1, wherein the light is a radially polarized beam.

* * * * *

UNITED STATES PATENT AND TRADEMARK OFFICE
CERTIFICATE OF CORRECTION

PATENT NO. : 7,335,873 B2  Page 1 of 1
APPLICATION NO. : 10/885663
DATED : February 26, 2008
INVENTOR(S) : Tomohiro Yamada et al.

It is certified that error appears in the above-identified patent and that said Letters Patent is hereby corrected as shown below:

<u>COLUMN 2</u>:

Line 22, "is." should read --is--.

<u>COLUMN 8</u>:

Line 16, "aperture." should read --apertures.--; and
Line 26, "pg,22" should be deleted.

Signed and Sealed this

Sixteenth Day of September, 2008

JON W. DUDAS
*Director of the United States Patent and Trademark Office*